United States Patent
Cho et al.

(10) Patent No.: US 11,784,340 B2
(45) Date of Patent: Oct. 10, 2023

(54) METHOD AND SYSTEM FOR CONTROLLING OPERATION OF FUEL CELL

(71) Applicants: Hyundai Motor Company, Seoul (KR); Kia Motors Corporation, Seoul (KR)

(72) Inventors: Sung Mun Cho, Gyeonggi-do (KR); Soon Woo Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 914 days.

(21) Appl. No.: 16/596,127

(22) Filed: Oct. 8, 2019

(65) Prior Publication Data

US 2020/0335811 A1    Oct. 22, 2020

(30) Foreign Application Priority Data

Apr. 17, 2019   (KR) .................. 10-2019-0045117

(51) Int. Cl.
| | | |
|---|---|---|
| H01M 8/2455 | (2016.01) | |
| H01M 8/04492 | (2016.01) | |
| H01M 8/0432 | (2016.01) | |
| H01M 8/22 | (2006.01) | |

(52) U.S. Cl.
CPC ....... *H01M 8/2455* (2013.01); *H01M 8/0432* (2013.01); *H01M 8/04529* (2013.01); *H01M 8/222* (2013.01)

(58) Field of Classification Search
CPC ............ H01M 8/2455; H01M 8/0432; H01M 8/04529; H01M 8/222
See application file for complete search history.

(56) References Cited

U.S. PATENT DOCUMENTS

| | | | |
|---|---|---|---|
| 10,249,896 B2 | 4/2019 | Kwon et al. | |
| 2013/0130140 A1* | 5/2013 | Kato | ........... H01M 8/0432 429/432 |
| 2013/0224615 A1* | 8/2013 | Makino | ........... H01M 8/04447 429/429 |
| 2019/0181465 A1 | 6/2019 | Lee et al. | |

FOREIGN PATENT DOCUMENTS

| | | |
|---|---|---|
| CN | 108232244 | 6/2018 |
| DE | 10 2017 212470 | 6/2018 |
| JP | 2012038455 A * | 2/2012 |

(Continued)

OTHER PUBLICATIONS

English machine translation of Morita (JP 2014154362 A) (Year: 2014).*

(Continued)

*Primary Examiner* — Brian R Ohara
*Assistant Examiner* — Aaron J Salter
(74) *Attorney, Agent, or Firm* — Fox Rothschild LLP

(57) ABSTRACT

A system and method for controlling operation of a fuel cell are provided. The method includes estimating an effective catalyst amount within a fuel cell stack and monitoring a change in the estimated effective catalyst amount according to time. An irreversible degradation state of the fuel cell stack is determined based on the monitored change in the estimated effective catalyst amount.

11 Claims, 10 Drawing Sheets

(56) References Cited

FOREIGN PATENT DOCUMENTS

| JP | 2012119165 A | * | 6/2012 |
| JP | 2014154362 A | * | 8/2014 |
| KR | 101293961 B1 | | 8/2013 |
| KR | 10-2018-0067740 A | | 6/2018 |
| KR | 10-2019-0070207 | | 6/2019 |

OTHER PUBLICATIONS

English machine translation of Kato et al. (JP 2012119165 A) (Year: 2012).*

English machine translation of Hasegawa et al. (JP 2012038455 A) (Year: 2012).*

* cited by examiner

METHOD AND SYSTEM FOR CONTROLLING OPERATION OF FUEL CELL

CROSS-REFERENCE TO RELATED APPLICATION

This application claims the priority benefit of Korean Patent Application No. 10-2019-0045117, filed on Apr. 17, 2019, the disclosure of which is incorporated herein by reference.

BACKGROUND

1. Field of the Invention

The present invention relates to a method for controlling a fuel cell system in which irreversible degradation of a fuel cell stack is divisionally determined and the fuel cell system optimally corresponds thereto.

2. Description of the Related Art

When a vehicle in a degraded state (an aged state) is driven, an amount of output generated by a fuel cell is reduced and thus power performance is reduced. Particularly, when the vehicle enters onto an expressway, it is difficult for the vehicle to momentarily accelerate to match a speed flow of other vehicles and thus driver safety may be threatened. Degradations of fuel cells may be divided into reversible degradation and irreversible degradation.

Particularly, reversible degradation, in which recovery of performance is possible, occurs when water produced by chemical reaction in a fuel cell stack is not discharged or an excessive amount of water is discharged and thus water shortage occurs, and, to adjust an amount of water, operating temperature control, air supply amount control, etc. may be performed as a method of responding to reversible degradation. Irreversible degradation, in which recovery of performance is impossible, occurs when an amount of a catalyst dispersed for chemical reaction is decreased or holes are formed through a proton electrolyte membrane and thus hydrogen crosses over the electrolyte membrane, and, in this case, output of the fuel cell is reduced.

A fuel cell vehicle is a hybrid vehicle which uses a fuel cell as a main power source and a high voltage battery as a secondary power source, thus increasing fuel efficiency and power performance. In development of fuel cell vehicles, optimum power distribution is performed before a fuel cell is degraded, and thus, when degradation of the fuel cell proceeds and the fuel cell becomes obsolete, the fuel cell deviates from the power distribution, which is optimal in a state before degradation of the fuel cell.

To maintain the optimum power distribution, technology to estimate degradation of the fuel cell is necessary. In measurement of degradation of the fuel cell, degradation of the fuel cell should be measured to be applied to a real vehicle, but no sensor capable of directly measuring irreversible degradation has been developed. According to conventional technologies, an effective catalyst amount of a fuel cell may be estimated, but irreversible degradation and reversible degradation of the fuel cell are unable to be distinguished from each other and accuracy in estimation is not reliable.

The above description has been provided to aid in understanding of the background of the present invention and should not be interpreted as conventional technology known to those skilled in the art.

SUMMARY

Therefore, the present invention provides a method and system for controlling operation of a fuel cell in which irreversible degradation is divisionally determined and operation of the fuel cell thereby is optimized.

In accordance with an aspect of the present invention, a method for controlling operation of a fuel cell may include estimating an effective catalyst amount within a fuel cell stack, monitoring change in the estimated effective catalyst amount according to time, and determining an irreversible degradation state of the fuel cell stack based on the monitored change in the estimated effective catalyst amount. The method may further include, prior to estimating the effective catalyst amount, determining whether a fuel cell (FC) stop mode configured to stop output of the fuel cell stack is released and the output of the fuel cell stack is resumed. Additionally, the effective catalyst amount may be estimated in response to determining that the output of the fuel cell stack is resumed.

In monitoring the change in the estimated effective catalyst amount according to time, gradual decrease in the estimated effective catalyst amount from a maximum value may be monitored when the output of the fuel cell stack is resumed. In estimating the effective catalyst amount, the effective catalyst amount may be estimated using state data including a water content of an electrode membrane, pressure of a cathode, pressure of an anode, temperature of cooling water, stack current and stack voltage.

Additionally, in monitoring the change in the estimated effective catalyst amount according to time, a decrease rate of the estimated effective catalyst amount, gradually decreased from a maximum value of the effective catalyst amount according to time, may be calculated, and, in the determining the irreversible degradation state, the irreversible degradation state of the fuel cell stack may be determined based on the calculated decrease rate of the estimated effective catalyst amount according to time. In determining the irreversible degradation state, a determination may be made that, as the calculated decrease rate of the estimated effective catalyst amount according to time is increased, the irreversible degradation state of the fuel cell stack becomes severe.

A delay time from a point in time when the output of the fuel cell stack is resumed to a point in time when the effective catalyst amount starts to be decreased from a maximum value may be measured when monitoring the change in the estimated effective catalyst amount according to time. In addition, in determining the irreversible degradation state of the fuel cell stack, the irreversible degradation state of the fuel cell stack may be determined based on the measured delay time. A determination may be made that, as the measured delay time is decreased, the irreversible degradation state becomes severe.

The method may further include controlling optimization of the operation of the fuel cell based on the determined irreversible degradation state, after determining the irreversible degradation state. In addition, a control may be executed to increase cooling performance of a cooling system of the fuel cell stack may be executed based on the determined irreversible degradation state. A control to increase pressure of a hydrogen supply system configured to supply hydrogen to the fuel cell stack may be executed based on the determined irreversible degradation state.

Further, a control to increase pressure of an air supply system configured to supply air to the fuel cell stack may be executed based on the determined irreversible degradation state and a control to increase output of a high voltage battery configured to supply required output distributively in conjunction with the fuel cell stack may be executed based on the determined irreversible degradation state.

In accordance with another aspect of the present invention, a system for controlling operation of a fuel cell may include a fuel cell stack, an effective catalyst amount sensing unit configured to estimate an effective catalyst amount within the fuel cell stack and to monitor change in the estimated effective catalyst amount according to time, and a degradation determiner configured to determine an irreversible degradation state of the fuel cell stack based on the change in the effective catalyst amount monitored by the effective catalyst amount sensing unit.

The system may further include an output controller configured to execute stoppage and resumption of output of the fuel cell stack. The effective catalyst amount sensing unit may be configured to monitor gradual decrease in the estimated effective catalyst amount from a maximum value, when an FC stop mode configured to stop the output of the fuel cell stack is released and the output of the fuel cell stack is resumed. The system may also include a data collector configured to collect state data including a water content of an electrode membrane, pressure of a cathode, pressure of an anode, temperature of cooling water, stack current and stack voltage, and the effective catalyst amount sensing unit may be configured to estimate the effective catalyst amount using the state data collected by the data collector.

Additionally, the system may include an optimization controller configured to operate a cooling system of the fuel cell stack to increase cooling performance thereof, to operate a hydrogen supply system configured to supply hydrogen to the fuel cell stack to increase pressure thereof, to operate an air supply system configured to supply air to the fuel cell stack to increase pressure thereof, or to operate a high voltage battery configured to supply required output distributively in conjunction with the fuel cell stack to increase output thereof, based on the determined irreversible degradation state determined by the degradation determiner.

The effective catalyst amount sensing unit, the output controller and the data collector may be implemented by a processor (not shown) configured to perform an operation which will be described below, using an algorithm configured to execute operations of various components of a vehicle or a non-volatile memory (not shown) configured to store data regarding software commands to reproduce the algorithm and the data stored in the corresponding memory. In particular, the memory and the processor may be implemented as separate chips.

Alternatively, the memory and the processor may be implemented as one integrated chip. One or more processors may be provided.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
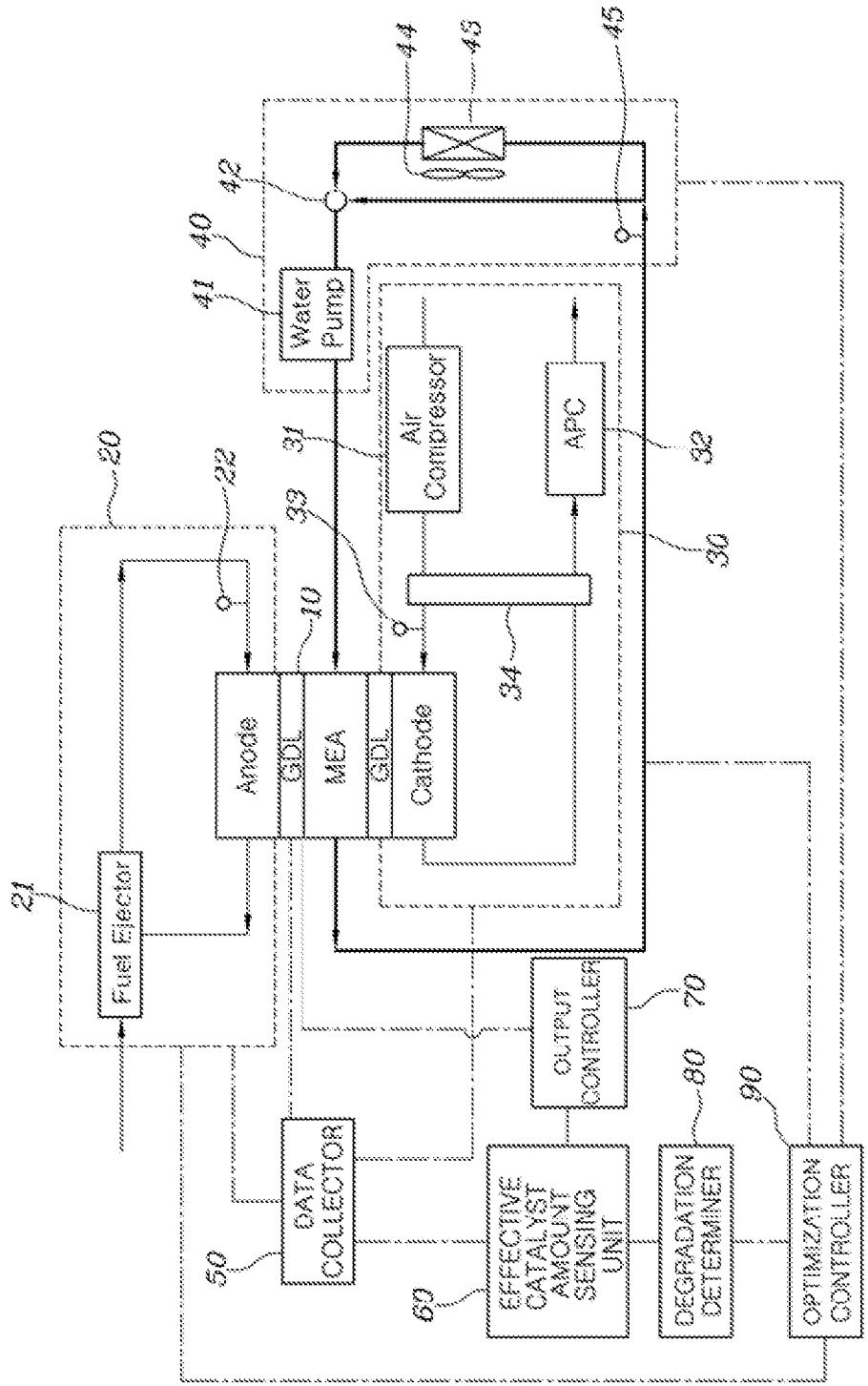
FIG. 1 is a block diagram illustrating a system for controlling operation of a fuel cell in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Specific structural or functional descriptions of exemplary embodiments of the present invention set forth in the description which follows will be exemplarily given to describe the exemplary embodiments of the present invention. However, the present invention may be embodied in many alternative forms and should not be construed as limited to the embodiments set forth herein.

The exemplary embodiments of the present invention may be variously modified and changed, and thus specific exemplary embodiments of the present invention will be illustrated in the drawings and described in detail in the following description of the exemplary embodiments of the present invention. However, the exemplary embodiments of the present invention are provided only to completely disclose the invention and to completely inform those skilled in the art of the scope of the invention.

In the following description of the exemplary embodiments, it will be understood that, when the terms "first", "second", etc. are used to describe various elements, these terms are not used to limit the elements. That is, these terms are used merely to discriminate the same or similar elements. Therefore, a first element may be named a second element and similarly a second element may be named a first element, within the technical scope of the invention unless stated otherwise.

In the following description of the exemplary embodiments, it will be understood that, when an element is "connected to", "coupled to", etc. another element, the two elements may be directly connected or coupled, or one or more other elements may be interposed between the two elements. On the other hand, it will be understood that, when an element is "directly connected to", "directly coupled to", etc. another element, any elements may not be interposed between the two elements. In the following description of the embodiments, other terms expressing relations between elements, such as "between" and "directly between" or "adjacent to" and "directly adjacent to", will be interpreted in the same manner.

It will be understood that all terms, including technical or scientific terms, used in the following description of the embodiments have the same meanings as those which are generally understood by those skilled in the art unless defined otherwise. Also, it will be interpreted that terms defined in generally used dictionaries have meanings coinciding with contextual meanings in the related art, and do not have ideal or excessively formal meanings unless defined apparently.

Hereinafter, reference will be made in detail to the exemplary embodiments of the present invention, examples of which are illustrated in the accompanying drawings. In the following description of the exemplary embodiments and the drawings, the same or similar elements are denoted by the same reference numerals even though they are depicted in different drawings.

FIG. 1 is a block diagram illustrating a system for controlling operation of a fuel cell in accordance with one exemplary embodiment of the present invention. Referring to FIG. 1, a system for controlling operation of a fuel cell in accordance with one exemplary embodiment of the present invention may include a fuel cell stack 10, an effective catalyst amount sensing unit 60 configured to estimate an effective catalyst amount within the fuel cell stack 10 and to monitor change in the estimated effective catalyst amount according to time, and a degradation determiner 60 configured to determine an irreversible degradation state of the fuel cell stack 10 based on change in the effective catalyst amount monitored by the effective catalyst amount sensing unit 60. Notably, the sensing unit 60 may be a unit including a plurality of sensors.

In the fuel cell stack 10, an anode receives hydrogen, a cathode receives air including oxygen, and thus the fuel cell stack 10 generates output. The generated output is supplied to a driving source, such as a motor, or a balance of plant (BOP). Further, the fuel cell stack 10 may be connected to the driving source or the BOP through a main bus terminal, and further include a high voltage battery, which will be described below, at the main bus terminal. The high voltage battery may be charged with output of the fuel cell stack 10, or assist output of the fuel cell stack 10 through discharge.

The effective catalyst amount sensing unit 60 may be configured to estimate an effective catalyst amount $L_c$ included in the fuel cell stack 10, and monitor change in the estimated effective catalyst amount $L_c$ according to time. Particularly, the effective catalyst amount sensing unit 60 may be configured to monitor a decrease rate of the effective catalyst amount $L_c$ according to time, and a delay time from a point in time when output of the fuel cell stack 10 is resumed to a point in time when the effective catalyst amount $L_c$ starts to be decreased from the maximum value, as will be described below. The degradation detector 80 may be configured to determine the irreversible degradation state of the fuel cell stack 10 based on change in the effective catalyst amount $L_c$ monitored by the effective catalyst amount sensing unit 60. In other words, the degradation determination unit 80 may be configured to determine a degree of progress of irreversible degradation of the fuel cell stack 10 using the decrease rate of the effective catalyst amount according to time, and the delay time from the point in time when output of the fuel cell stack 10 is resumed to the point in time when the effective catalyst amount starts to be decreased from the maximum value.

Further, the system in accordance with one exemplary embodiment of the present invention may further include an output controller 70 configured to execute stoppage and resumption of output of the fuel cell stack 10. In other words, the output controller 70 may be configured to stop or resume the fuel cell stack output. Additionally, the effective catalyst amount sensing unit 60 may be configured to monitor gradual decrease in the effective catalyst amount from the maximum value, when the output controller 70 releases an FC stop mode configured to stop output of the fuel cell stack 10 and output of the fuel cell stack 10 is resumed.

The output controller 70 may be configured to stop output of the fuel cell stack 10 when output required by the driving source is relatively low and a state of charge (SOC) of the high voltage battery is sufficient even when the fuel cell is started up. On the contrary, the output controller 70 may be configured to resume output of the fuel cell stack 10 when output required by the driving source is increased or the SOC of the high voltage battery is decreased. Therefore, efficiency and fuel efficiency of a fuel cell system may be increased. The effective catalyst amount sensing unit 60 may be configured to estimate an effective catalyst amount in the state in which the FC stop mode is released and output of the fuel cell stack 10 is resumed, and monitor change in the estimated effective catalyst amount according to time. Particularly, the effective catalyst amount sensing unit 60 may be configured to monitor gradual decrease in the estimated effective catalyst amount from the maximum value.

The system in accordance with one exemplary embodiment of the present invention may further include a data collector 50 configured to collect state data including a water content of an electrode membrane, pressure of a cathode, pressure of an anode, temperature of cooling water, stack current and stack voltage, and the effective catalyst amount sensing unit 60 may be configured to estimate an effective catalyst amount using the state data collected by the data collector 50. The data collector 50 may be connected to a cathode pressure sensor 33 to measure pressure of the cathode and an anode pressure sensor 22 to measure pressure of the anode, and may thus collect the pressure of the cathode and the pressure of the anode.

Further, the water content of the electrode membrane is a quantity of moisture contained in the electrode membrane, and may be detected through relative humidity of an exit terminal of the cathode. The water content of the electrode membrane is proportional to relative humidity, and may thus be acquired by multiplying the relative humidity of the exit terminal by a constant, or acquired by storing an equation in advance and inputting the relative humidity to the equation.

The temperature of the cooling water is a parameter used to estimate the temperature of the fuel cell stack 10, and may be measured by a water temperature sensor 45 disposed at an exit or output of the fuel cell stack 10. The temperature of the fuel cell stack 10 may be estimated by storing an equation in advance and inputting the temperature of the cooling water into the equation. The stack current and the stack voltage may be measured by a current sensor or a voltage sensor. For the stack current, current supplied from the fuel cell stack 10 to the main bus terminal may be measured. For the stack voltage, voltage of the overall fuel cell stack 10 may be measured, or voltage of each cell of the fuel cell stack 10 may be measured.

The system in accordance with one exemplary embodiment of the present invention may further include an optimization controller 90 configured to operate a cooling system 40 of the fuel cell stack 10 to increase cooling performance thereof, to operate a hydrogen supply system 20, configured to supply hydrogen to the fuel cell stack 10, to increase pressure thereof, to operate an air supply system 30, configured to supply air to the fuel cell stack 10, to increase pressure thereof, and to operate the high voltage battery, configured to supply required output in conjunction with the fuel cell stack 10, to increase output thereof, based on the determined irreversible degradation state. In other words, the optimization controller 90 may be configured to control optimization of the cooling system 40, the hydrogen supply system 20, and the air supply system 30, and control optimization of output distribution between the fuel cell stack 10 and the high voltage battery.

Figure 2:
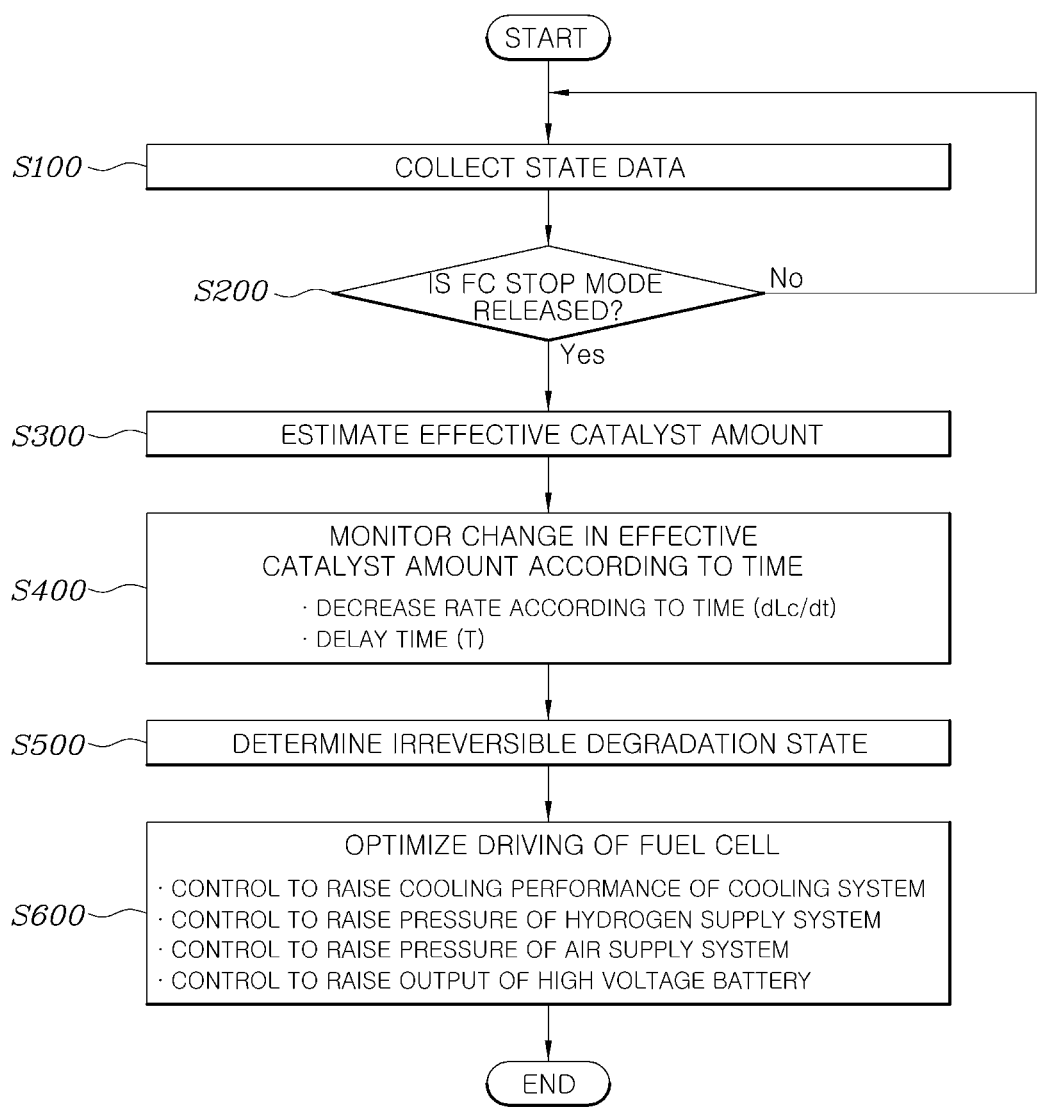
FIG. 2 is a flowchart illustrating a method for controlling operation of a fuel cell in accordance with one exemplary embodiment of the present invention.

To describe a detailed control method through the optimization controller 90, a method for controlling operation of a fuel cell which will be described below will be referred to. FIG. 2 is a flowchart illustrating a method for controlling operation of a fuel cell in accordance with one exemplary embodiment of the present invention. The method described herein below may be executed by an overall controller having a processor and a memory.

Referring to FIG. 2, a method for controlling operation of a fuel cell in accordance with one exemplary embodiment of the present invention may include estimating an effective catalyst amount within the fuel cell stack 10 (Operation S300), monitoring change in the estimated effective catalyst amount according to time (Operation S400), and determining an irreversible degradation state of the fuel cell stack 10 based on the monitored change in the estimated effective catalyst amount (Operation S500). Therefore, the irreversible degradation state of the fuel cell stack 10 may be determined to be distinguishable from reversible degradation of the fuel cell stack 10.

In estimation of the effective catalyst amount within the fuel cell stack 10 (Operation S300), the effective catalyst amount may be estimated using state data including a water content of the electrode membrane, pressure of the cathode, pressure of the anode, temperature of cooling water, stack current and stack voltage. Prior to estimation of the effective catalyst amount (Operation S300), in collection of the state data (Operation S100), the state data including the water content of the electrode membrane, the pressure of the cathode, the pressure of the anode, the temperature of cooling water, the stack current and the stack voltage may be collected, and, in the estimation of the effective catalyst amount (Operation S300), a mathematical voltage model may be derived by substituting the state data into a voltage calculation equation. The voltage calculation equation is an equation to indirectly calculate a voltage output from the fuel cell using various input values.

In the voltage calculation equation, mathematical voltage $V_m$ may be calculated by subtracting activation loss $V_{act}$, resistance loss (or ohm loss) $V_{ohm}$ and concentration loss $V_{con}$ from lossless thermodynamic theoretical voltage E, as stated in Equation 1 below. Activation loss is loss which occurs to decrease activation energy to produce reaction, resistance loss is loss which is caused by migration resistance of ions in an electrolyte and migration resistance of electrons in electrodes, a gas diffusion layer and a separator. Concentration loss is loss which is caused by lack of ability of maintaining an average initial concentration of a fluid due to consumption of reactants at the electrodes by electrochemical reaction.

In particular, in Equation 1 below, an expression to calculate thermodynamic theoretical voltage E is stated on the first line, an expression to calculate activation loss $V_{act}$ is stated on the second line, an expression to calculate resistance loss $V_{ohm}$ is stated on the third line, and an expression to calculate concentration loss $V_{con}$ is stated on the fourth line. The thermodynamic theoretical voltage E may be equal to open circuit voltage (OCV).

Equation 1

$$V_m = \frac{-\Delta G}{2F} + \frac{R_u T}{nF} \ln\left(\frac{\left(\frac{P_a - \varphi P_{H_2O\_sat}}{P_a^0}\right)\left(\frac{P_c - \varphi P_{H_2O\_sat}}{P_c^0}\right)^{0.5}}{a_{H_2O}}\right) - \frac{R_u T}{\alpha n F}$$

-continued $$\ln\left(\frac{i+i_{in}}{i_{o,ref}A_cL_c\left(\frac{P_c-\varphi P_{H_2O\_sat}}{P_c^0}\right)^{0.5}e^{\frac{E_c}{R}\left(\frac{1}{T}-\frac{1}{298.15}\right)}}\right)-(i+i_{in})\left(R_u+\right.$$

$$\left.\frac{t_m}{0.005139(0.043+17.81\varphi-39.85\varphi^2+36\varphi^2)-}e^{1268\left(\frac{1}{T}-\frac{1}{303}\right)}\right)+$$
$$0.00326$$

$$d\frac{R_UT}{nF}\ln\left(1-\frac{i+i_{in}}{D_{0,ref}\frac{T^{0.5}}{T_0^{1.5}}\left(\frac{P_c-\varphi P_{H_2O\_sat}}{P_c^0}\right)}\right)$$

$$i=\frac{I_{FC}}{A_c}$$

$P$: pressure, kPa $P_{sat}$: saturation pressure, kPa $F$: Faraday's constant, 96,487 C/mol $R_u$: universal gas constant, 8.314 $J/mol/k$ $T$: temperature, °K.

$T_c$: temperature, °C.

$E$: Ideal cell potential, V $R$: resistance $i$: current density, (A/cm2)

$D$: diffusivity $A_c$: catalyst specific area $L_c$: catalyst loading $E_c$: activation energy 65 $kJ$/mol $V$: potential, V $d$: concentration coefficient $n$: number of electron per molecule of hydrogen, 2

$i_{in}$: internal current density, (A/cm2)

$i_L$: limiting current density, (A/cm2)

$L_m$: thickness of membrane $K_m$: ion conductance of membrane $P_a$: pressure of anode $P_c$: pressure of cathod $a_{H2O}$: activity of water $P_{H2O\_sat}$: saturated water vapor pressure $R_m$: resistance of membrane $R_S$: resistance of rest of cell $F$: Faraday constant, 96487 (C/mol)

$G$: Gibb's free energy. (J)

$\sigma$: relative humidity $\alpha$: transfer coefficient $a$: water activity $t$: thickness $\delta$: diffusion distance $\varepsilon$: porosity $\lambda$: percentage of water content of membrane Subscripts H2: hydrogen O2: oxygen H2O: water ref: reference condition (298.15K, 101.25 kPa)

$m$: membrane

When measured or estimated state data is substituted into Equation 1 above, a voltage value $V_m$ with respect to a specific current density i may be acquired, and the mathematical voltage model may be derived by forming a graph, in which the X-axis represents current density and the Y-axis represents cell voltage, using these values. The above Equation includes several variables, such as a reaction area $A_c$, an effective catalyst amount $L_c$ and an internal current density $i_{in}$.

Therefore, by varying only one variable while fixing the remaining variables to initially substituted values, the graph of the mathematical voltage model and the graph of a measured stack voltage have similar shapes, and a variable value at a point in time when the graphs of the mathematical voltage model and the stack voltage have similar shapes is a variable value to be acquired. In such a graph fitting manner, the reaction area $A_c$ and the effective catalyst amount $L_c$ are acquired.

First, a value of the mathematical voltage model may be close to the measured stack voltage by varying reaction area data, and a reaction area when the value of the mathematical voltage model is close to the measured stack voltage may be acquired. Stack voltage acquired by varying the reaction area data may be the minimum cell voltage. In other words, a mathematical voltage model using the minimum cell voltage may be acquired as the mathematical voltage model derived by varying the reaction area data, the minimum cell voltage which is actually measured is defined as the stack voltage, and thus the reaction area may be derived by comparing the value of the mathematical voltage model with the stack voltage.

Further, a value of the mathematical voltage model may be close to the measured stack voltage by varying effective catalyst amount data, and an effective catalyst amount when the value of mathematical voltage model is close to the measured stack voltage may be acquired. Stack voltage acquired by varying the effective catalyst amount data may be an average cell voltage. In other words, a mathematical voltage model using the average cell voltage may be acquired as the mathematical voltage model derived by varying the effective catalyst amount data, an average cell voltage which is actually measured is defined as the stack voltage, and the effective catalyst amount may be derived by comparing the value of the mathematical voltage model with the stack voltage. Additionally, a value of the mathematical voltage model may be close to the measured stack voltage by varying internal current density data, and an internal current density when the value of mathematical voltage model is close to the measured stack voltage may be acquired.

The method in accordance with one exemplary embodiment of the present invention may further include, prior to the estimation of the effective catalyst amount (Operation S300), determining whether the FC stop mode to stop output of the fuel cell stack 10 is released and output of the fuel cell stack 10 is resumed, and, in the estimation of the effective catalyst amount (Operation S300), the effective catalyst amount may be estimated in response to determining that output of the fuel cell stack 10 is resumed. In the FC stop mode to stop output of the fuel cell stack 10, the fuel cell stack 10 may be in a state in which output of the fuel cell stack 10 is stopped under the condition that the fuel cell is started up, i.e., in an idle stop state. In this state, air supply to the fuel cell stack 10 may be stopped.

Particularly, in the estimation of the effective catalyst amount (Operation S300), the effective catalyst amount may be continuously estimated from a point in time when output of the fuel cell stack 10 is resumed from the output stopped state of the fuel cell stack 10. Further, in the monitoring of change in the effective catalyst amount according to time (Operation S400), gradual decrease in the estimated effective catalyst amount from the maximum value by resuming output of the fuel cell stack 10 may be monitored.

The effective catalyst amount may have a maximum value in the output stopped state of the fuel cell stack 10, and the effective catalyst amount may be gradually decreased from the maximum value when output of the fuel cell stack 10 is resumed. In monitoring of the change in the effective catalyst amount according to time (Operation S400), gradual decrease in the estimated effective catalyst amount from the maximum value may be monitored. In particular, the effective catalyst amount is changed in real time while the fuel cell stack 10 generates output. Particularly, even during 1 cycle of operation of the fuel cell stack 10, the effective catalyst amount of the fuel cell stack 10 is varied from an effective catalyst amount in the beginning of life (BOL) of the fuel cell stack 10 to an effective catalyst amount in the end of life (EOL) of the fuel cell stack 10, and thus, it may be difficult to divisionally determine irreversible degradation of the fuel cell using the effective catalyst amount.

When voltage of the fuel cell stack 10 is increased or is greater than a predetermined voltage, e.g. when the fuel cell is restarted or output of the fuel cell stack 10 is resumed, oxygen radicals (—O) or hydroxyl radicals (—OH) are adsorbed onto the surface of a catalyst and thus the surface area of the catalyst is decreased. On the other hand, when voltage of the fuel cell stack is low, oxygen radicals (—O) or hydroxyl radicals (—OH) are separated from the surface of the catalyst and thus the surface area of the catalyst is increased. This is the same as a principle that, as the reaction area or the effective catalyst amount is increased, voltage of the fuel cell is decreased, and may be understood from the above-described voltage equation of the fuel cell.

In the state in which output of the fuel cell stack 10 is stopped, stack current is not generated, opening circuit voltage (OCV) may serve as stack current, and the effective catalyst amount may be estimated as the maximum value (e.g., about 0.5). Particularly, in the state in which output of the fuel cell stack 10 is stopped, the stack current is exposed to high potential close to opening circuit voltage (OCV), oxygen radicals (—O) or hydroxyl radicals (—OH) are temporarily adsorbed onto the surface of the catalyst and thus the surface area of the catalyst is temporarily decreased. Thereafter, when output of the fuel cell stack 10 is resumed, the temporarily adsorbed oxygen radicals (—O) or hydroxyl radicals (—OH) are separated from the surface of the catalyst and thus the surface of the catalyst is increased again. Therefore, when, in the state in which output of the fuel cell stack 10 is stopped, output of the fuel cell stack 10 is resumed, the effective catalyst amount may be estimated as a catalyst amount remaining after dissipation caused by irreversible degradation.

Figure 3:
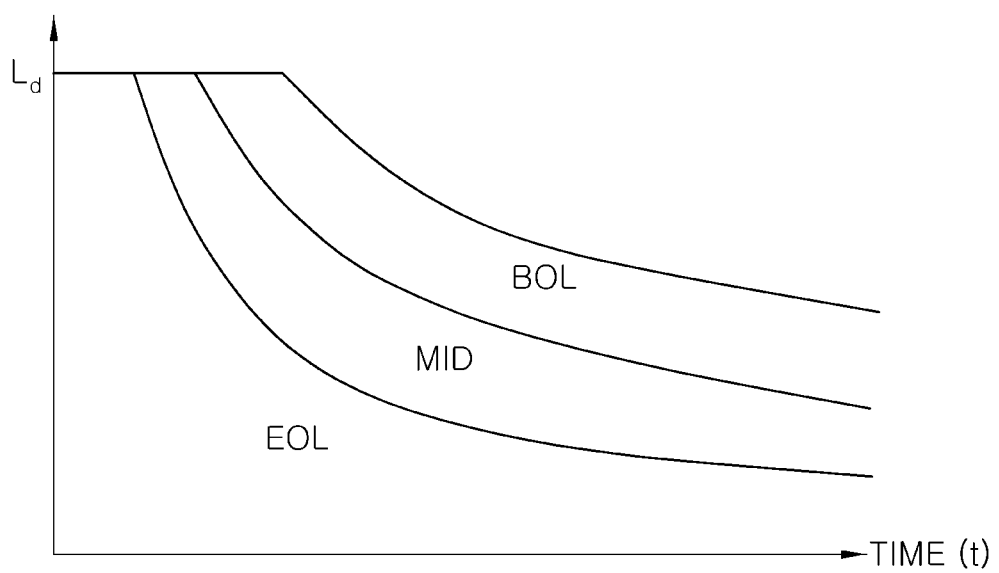
FIG. 3 is a graph representing change in an effective catalyst amount according to time in the state in which an FC stop mode to stop output of a fuel cell stack in accordance with one exemplary embodiment of the present invention is released and output of the fuel cell stack is resumed.

FIG. 3 is a graph representing change in an effective catalyst amount according to time in the state in which the FC stop mode to stop output of the fuel cell stack in accordance with one exemplary embodiment of the present invention is released and output of the fuel cell stack is resumed. Referring to FIG. 3, it will be understood that, if the catalyst amount remaining after dissipation caused by irreversible degradation is substantial, a decrease rate of the effective catalyst amount from the maximum value is minimal under the condition that the stack voltage is the OCV, and, if the catalyst amount remaining after dissipation caused by irreversible degradation is minimal, a decrease rate of the effective catalyst amount from the maximum value to a pure catalyst amount remaining after dissipation is very high under the condition that the stack voltage is the OCV.

Therefore, as exemplarily shown in FIG. 3, when output of the fuel cell stack 10 is resumed, the decrease rates in the effective catalyst amount in the beginning of life (BOL), the end of life (EOL) and the middle of life (MID) of the fuel cell stack 10 are different. Particularly, the effective catalyst amount may be decreased most slowly in the beginning of life (BOL) of the fuel cell stack 10, and the effective catalyst amount may be decreased fastest in the end of life (EOL) of the fuel cell stack 10.

In one exemplary embodiment, in monitoring the change in the effective catalyst amount according to time (Operation S400), a decrease rate of the effective catalyst amount, which is gradually decreased from the maximum value according to time, may be calculated, and, in determination of the irreversible degradation state of the fuel cell stack 10 (Operation S500), the irreversible degradation state of the fuel cell stack 10 may be determined based on the calculated decrease rate of the effective catalyst amount according to time.

Specifically, a decrease rate of the effective catalyst amount according to time, in a section where the effective catalyst amount is decreased from the maximum value, may be calculated. More specifically, the irreversible degradation state of the fuel cell stack 10 may be determined by calculating a decrease rate of the effective catalyst amount for a predetermined time and comparing the calculated decrease rate. In the determination of the irreversible degradation state of the fuel cell stack 10 (Operation S500), as the calculated decrease rate of the effective catalyst amount according to time is increased, the irreversible degradation state becomes severe. As shown in FIG. 3, as the irreversible degradation state becomes severe, the decrease rate of the effective catalyst amount according to time is increased, and thereby, irreversible degradation of the fuel cell stack 10 may be determined.

Figure 4:
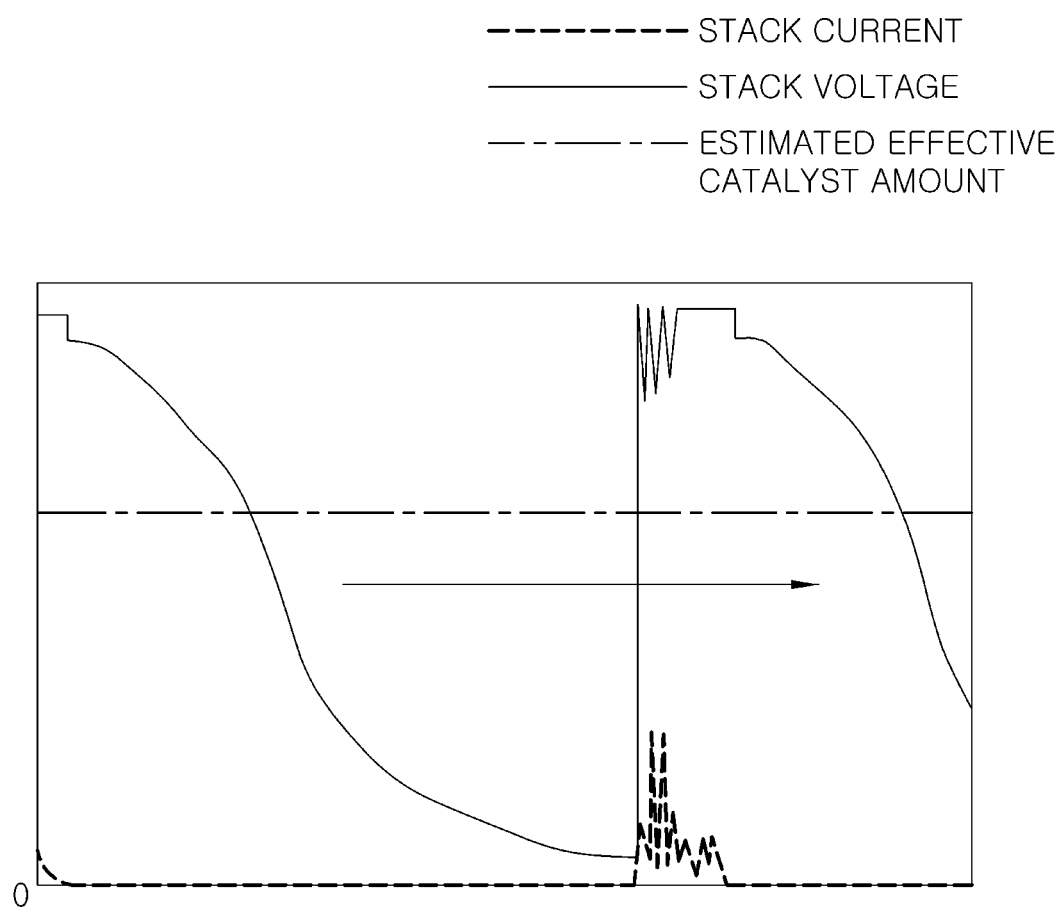
FIGS. 4 to 6 are graphs representing change in an effective catalyst amount according to time in a state in which the FC stop mode to stop output of the fuel cell stack is released according to driving distance of a real fuel cell vehicle in accordance with one exemplary embodiment of the present invention.
Figure 5:
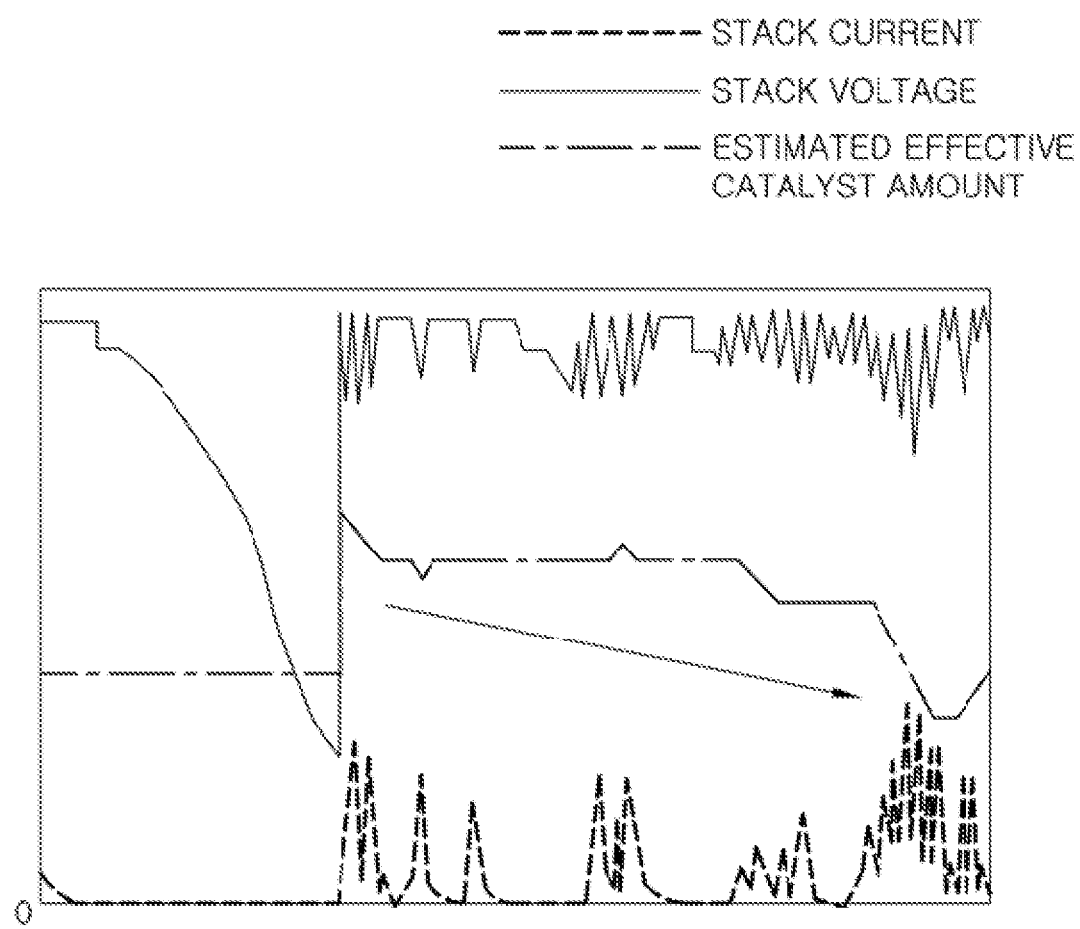
Figure 6:
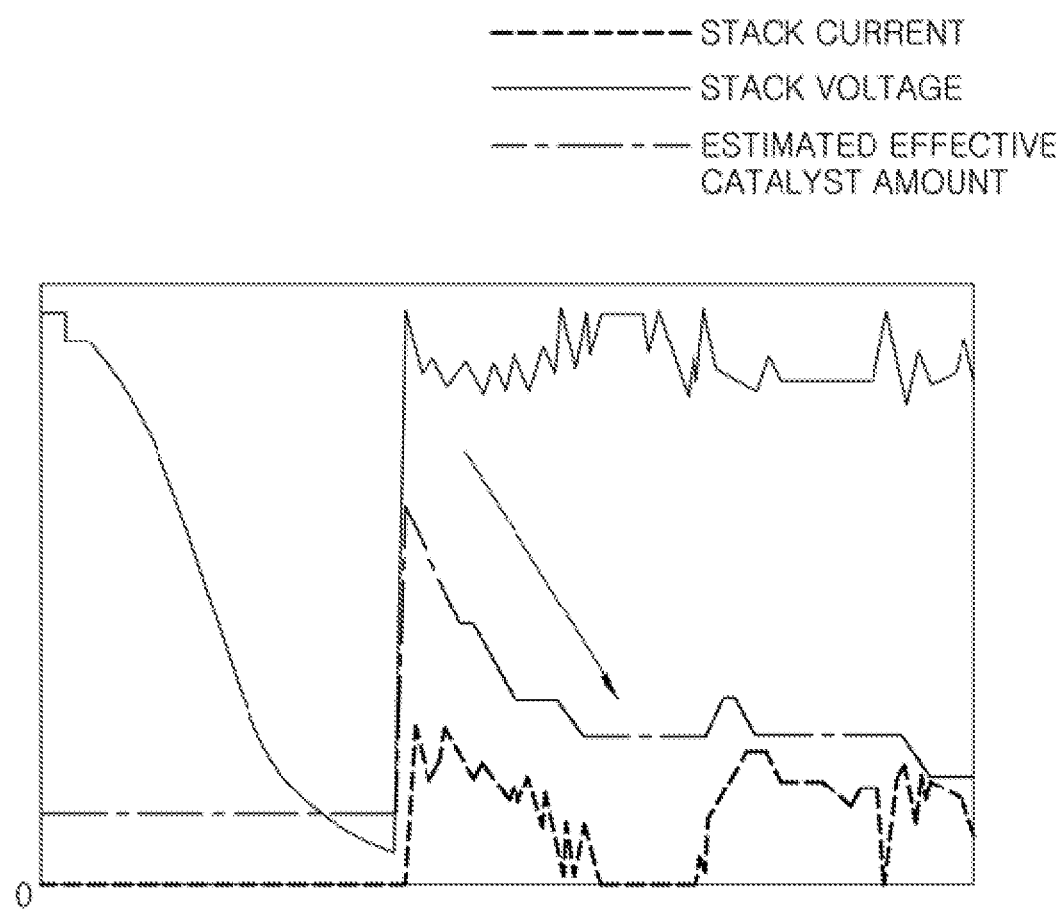

FIGS. 4 to 6 are graphs representing change in an effective catalyst amount according to time in a state in which the FC stop mode to stop output of the fuel cell stack is released according to driving distance of a real fuel cell vehicle. FIG. 4 is a graph representing change in the effective catalyst amount in the beginning of life (BOL) of the fuel cell stack 10, i.e., in a state in which the driving distance of the fuel cell vehicle is close to 0. In particular, it may be confirmed that, even when output of the fuel cell stack 10 is resumed, the estimated effective catalyst amount is changed minimally and is maintained uniformly.

FIG. 5 is a graph representing change in the effective catalyst amount in the middle of life (MID) of the fuel cell stack 10, i.e., in a state in which the driving distance of the fuel cell vehicle corresponds to half the life of the fuel cell stack 10. In particular, it may be confirmed that, when output of the fuel cell stack 10 is resumed, the estimated effective catalyst amount is maintained uniformly and is then gradually decreased.

FIG. 6 is a graph representing change in the effective catalyst amount in the end of life (EOL) of the fuel cell stack 10, i.e., in a state in which the driving distance of the fuel cell vehicle almost reaches the end of the life of the fuel cell stack 10. In particular, it may be confirmed that, when output of the fuel cell stack 10 is resumed, the estimated effective catalyst amount is rapidly decreased.

Figure 7A:
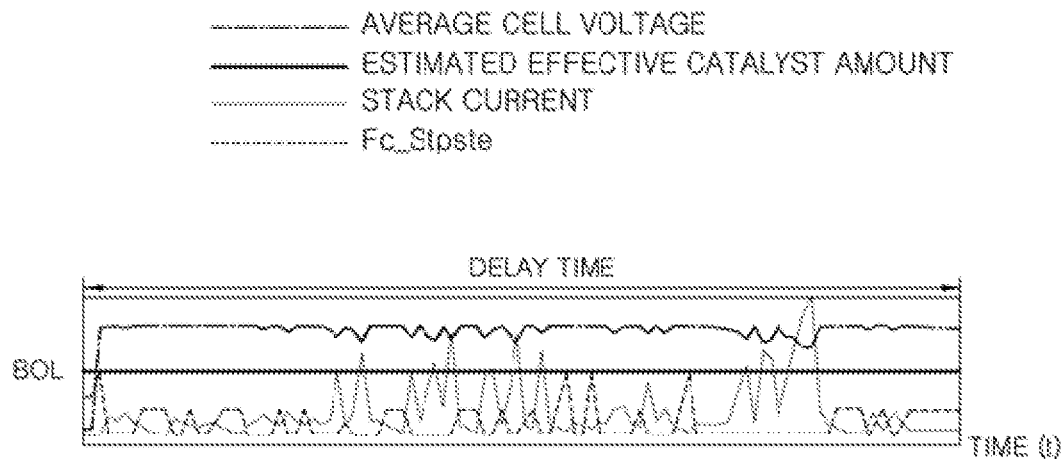
FIGS. 7A-7C are graphs representing change in an effective catalyst amount according to time in a state in which the FC stop mode is released and the fuel cell stack is controlled to output the same stack current according to driving distance of the real fuel cell vehicle in accordance with one exemplary embodiment of the present invention.
Figure 7B:
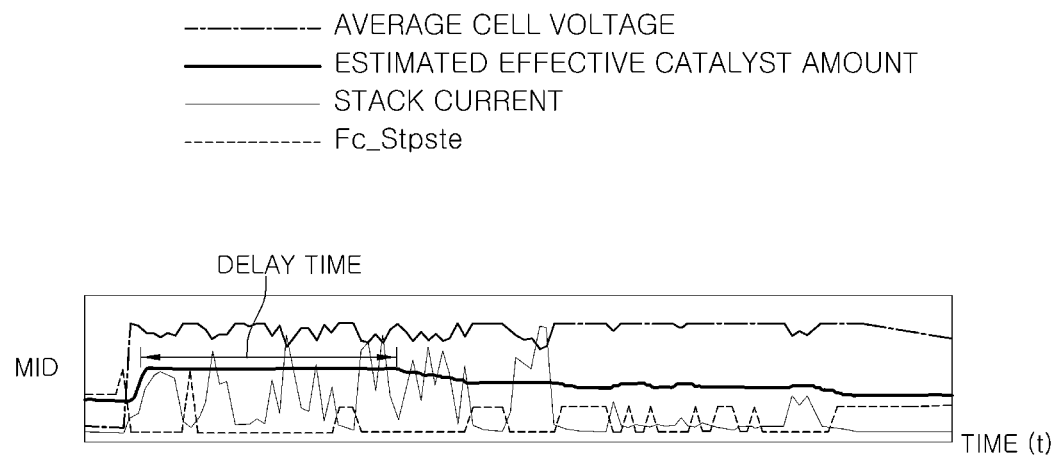
Figure 7C:
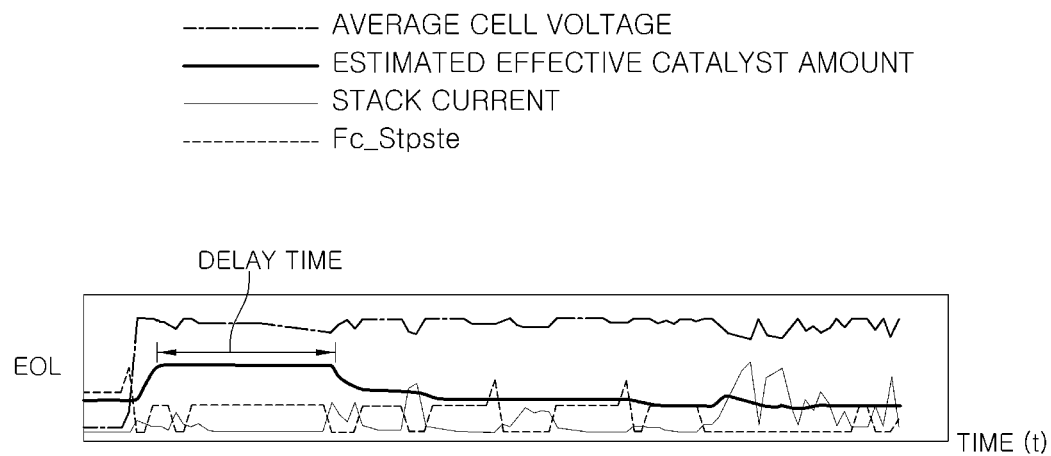

FIGS. 7A to 7C are graphs representing change in an effective catalyst amount according to time in a state in which the FC stop mode is released and the fuel cell stack is operated to output the same stack current according to driving distance of the real fuel cell vehicle. Particularly, an output state of the fuel cell stack 10 is indicated by Fc_Stp-ste.

Referring to FIGS. 7A-7C, in another exemplary embodiment, in monitoring the change in the effective catalyst amount according to time (Operation S400), a delay time from a point in time when output of the fuel cell stack 10 is resumed to a point in time when the effective catalyst amount starts to be decreased from the maximum value may be measured. In the determination of the irreversible degradation state of the fuel cell stack 10 (Operation S500), the irreversible degradation state of the fuel cell stack 10 may be determined based on the measured delay time.

FIG. 7A is a graph representing change in the effective catalyst amount in the beginning of life (BOL) of the fuel cell stack 10, i.e., in the state in which the driving distance of the fuel cell vehicle is close to 0, FIG. 7B is a graph representing change in the effective catalyst amount in the middle of life (MID) of the fuel cell stack 10, i.e., in the state in which the driving distance of the fuel cell vehicle corresponds to half the life of the fuel cell stack 10, and FIG. 7C is a graph representing change in the effective catalyst amount in the end of life (EOL) of the fuel cell stack 10, i.e., in the state in which the driving distance of the fuel cell vehicle almost reaches the end of the life of the fuel cell stack 10.

Particularly, in the beginning of life (BOL) of the fuel cell stack 10, the effective catalyst amount is not decreased from the maximum value and is maintained to the maximum value. Therefore, in this case, the delay time is substantial (e.g., greater than a predetermined period of time). In the middle of life (MID) of the fuel cell stack 10, the effective catalyst amount is maintained to the maximum value and then starts to be decreased. Therefore, the delay time may have a relatively large value. In the end of life (EOL) of the fuel cell stack 10, the delay time for which the effective catalyst amount is maintained to the maximum value is very short. The delay time may range from tens of seconds to hundreds of seconds or more.

Therefore, the irreversible degradation state of the fuel cell stack 10 may be determined using the delay time from the point in time when output of the fuel cell stack 10 is resumed to the point in time when the effective catalyst amount starts to be decreased from the maximum value. Particularly, in determination of the irreversible degradation state of the fuel cell stack 10 (Operation S500), it may be determined that, as the measured delay time is decreased, the irreversible degradation state becomes severe. Therefore, in the determination of the irreversible degradation state of the fuel cell stack 10 (Operation S500), the irreversible degradation state may be determined using the calculated decrease rate of the effective catalyst amount according to time, the measured delay time, or both. The irreversible degradation state may be determined as a plurality of states using a plurality of determined reference values.

After the determination of the irreversible degradation state of the fuel cell stack 10 (Operation S500), the method in accordance with one exemplary embodiment of the present invention may further include controlling optimization of operation of the fuel cell based on the determined irreversible degradation state (Operation S600). In control of optimization of operation of the fuel cell (Operation S600), operation of the fuel cell may be adjusted to be in a predetermined optimization state, if the irreversible degradation state corresponds to the beginning of life (BOL) of performance of the fuel cell stack 10.

In operation of the fuel cell, an operating point of the fuel cell may be set such that performance of the fuel cell stack 10 is optimized in the beginning of life (BOL) of the fuel cell stack 10, and, when performance of the fuel cell stack 10 is lowered due to irreversible degradation, the optimum operating point should be changed. However, when the operating point is adjusted to be actually changed prior to occurrence of irreversible degradation, efficiency and power performance of the fuel cell are reduced and thus the fuel cell may be operated in a reduced efficiency state. In accordance with the present invention, irreversible degradation may be divisionally determined and the fuel cell may be operated based on an actually determined irreversible degradation state. Therefore, output performance and efficiency of the fuel cell may be increased and thereby marketability of the fuel cell may be improved.

Figure 8:
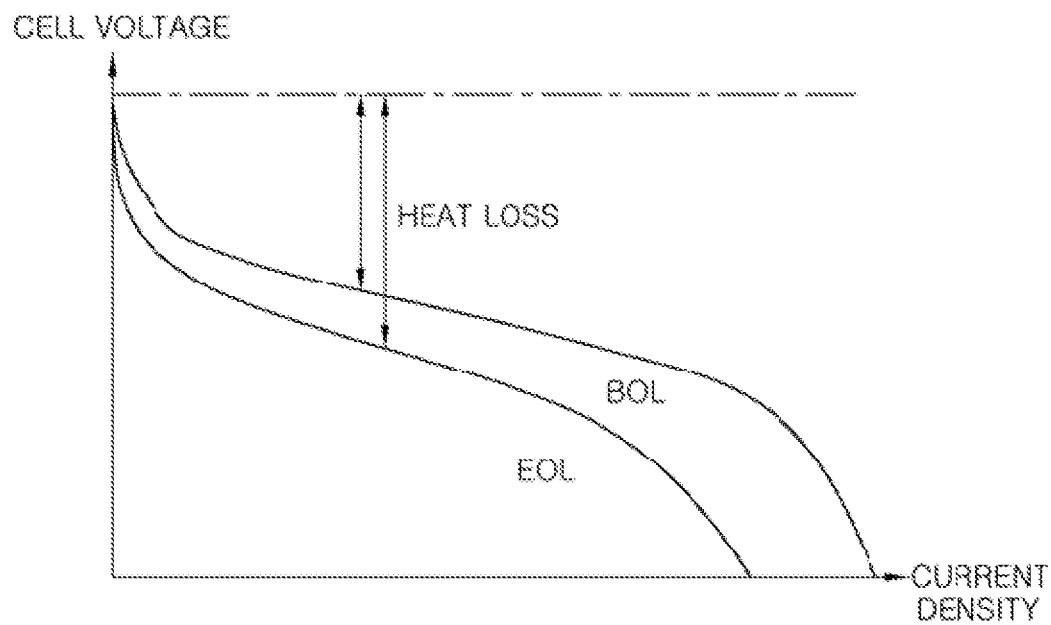
FIG. 8 is a graph representing I-V curves in respective states of the fuel cell stack in accordance with one exemplary embodiment of the present invention.

FIG. 8 is a graph representing I-V curves in respective states of the fuel cell stack 10. Referring to FIG. 8, it may be confirmed that, as the irreversible degradation state of the fuel cell stack 10 becomes severe, voltage may be decreased at the same current or current may be increased at the same output. In other words, it may be confirmed that, even if the same electric energy is produced, a greater amount of heat energy is generated in the end of life (EOL) of the fuel cell stack 10 than in the beginning of the lift (BOL) of the fuel cell stack 10.

In one exemplary embodiment, in control of optimization of operation of the fuel cell (Operation S600), the cooling system 40 of the fuel cell stack 10 may be operated to increase cooling performance thereof based on the determined irreversible degradation state. The cooling system 40 may be configured to cool the fuel cell stack 10, and may include a cooling pump 41 configured to supply a refrigerant to the fuel cell stack 10, a radiator 43 configured to cool the heated refrigerant, a fan 44 configured to blow air to the radiator 43, a temperature control valve 42 configured to adjust a flow rate of the refrigerant passing through the radiator 43, etc.

In control of optimization of operation of the fuel cell (Operation S600), as the irreversible degradation state of the fuel cell stack 10 becomes severe, cooling performance of the cooling system 40 may be increased. In particular, the cooling system 40 may be operated to increase revolutions per minute (RPM) of the cooling pump 41 or to increase an RPM of the fan 44 blowing air to the radiator 43, and the temperature control valve 42 of the cooling system 40 may be operated to increase a flow rate of the refrigerant passing through the radiator 43.

Figure 9:
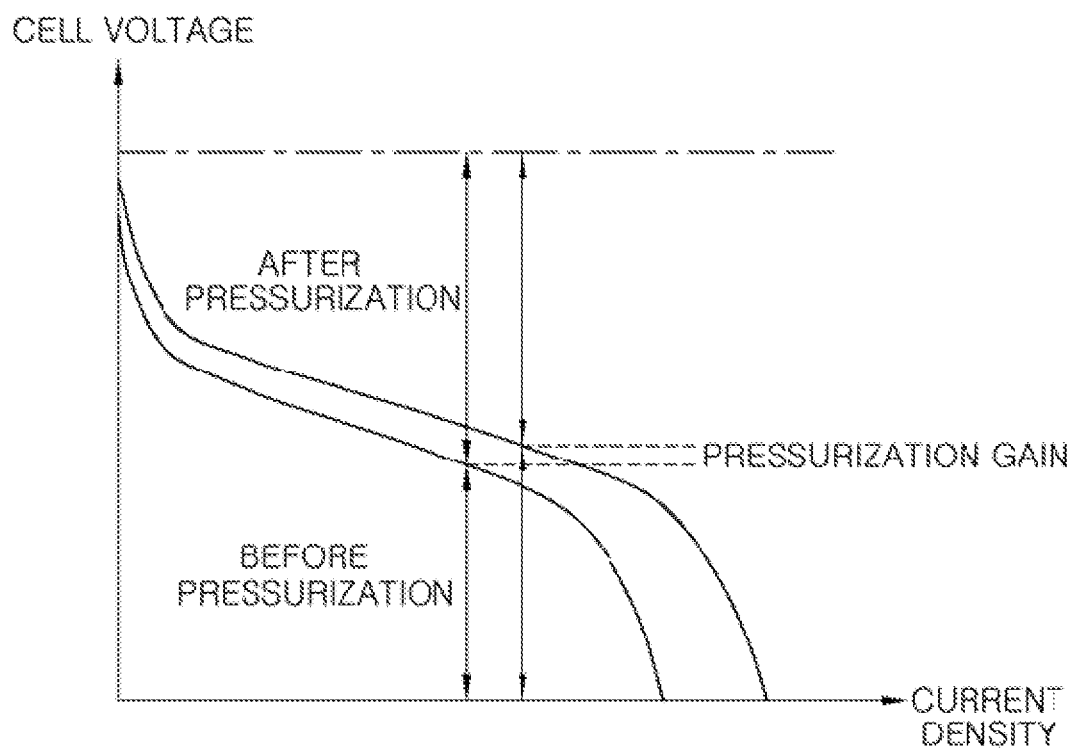
FIG. 9 is a graph representing I-V curves before and after pressurization of hydrogen and air supplied to the fuel cell stack in accordance with one exemplary embodiment of the present invention.

FIG. 9 is a graph representing I-V curves before and after pressurization of hydrogen and air supplied to the fuel cell stack 10. Referring to FIG. 9, it may be confirmed that, if hydrogen supplied to the fuel cell stack 10 or air supplied to the fuel cell stack 10 is pressurized, voltage may be increased at the same current. In other words, as the concentration of a reactant is increased, a voltage of an I-V curve may be increased and power generation efficiency of the fuel cell may be increased.

In control of optimization of operation of the fuel cell (Operation S600), the hydrogen supply system 20 configured to supply hydrogen to the fuel cell stack 10 may be operated to increase the pressure thereof based on the determined irreversible degradation state. The hydrogen supply system 20 may include a recirculation line to recirculate hydrogen to the fuel cell stack 10, a hydrogen supply valve configured to adjust hydrogen supply between the recirculation line and a hydrogen tank, a fuel ejector 21, etc. In particular, as the irreversible degradation state of the fuel cell stack 10 becomes severe, the pressure of the hydrogen supply system 20 may be increased and, in this case, the pressure of the hydrogen supply system 20 may be increased by increasing a degree of opening of the hydrogen supply valve or operating the fuel ejector 21.

Further, in control of optimization of operation of the fuel cell (Operation S600), the air supply system 30 configured to supply air to the fuel cell stack 10 may be operated to increase the pressure thereof based on the determined irreversible degradation state. The air supply system 30 may include an air compressor 31 configured to compress external air and then supply compressed air to the fuel cell stack 10, an air pressure controller (APC) valve disposed in a line through which air is discharged from the fuel cell stack 10, a humidifier 34 disposed in a line through which air is supplied to the fuel cell stack 10, etc. In particular, as the irreversible degradation state of the fuel cell stack 10 becomes severe, the pressure of the air supply system 30 may be increased and, in this case, the RPM of the air compressor 31 may be increased or a degree of opening of the APC valve 32 may be decreased.

Figure 10:
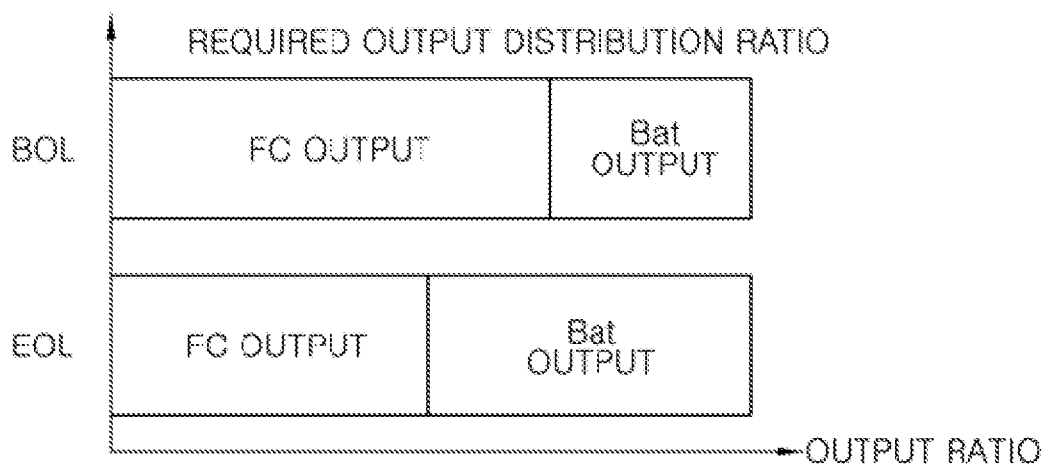
FIG. 10 is a graph representing a required output distribution ratio varied according to an irreversible degradation state in accordance with one exemplary embodiment of the present invention.

FIG. 10 is a graph representing a required output distribution ratio varied according to an irreversible degradation state in accordance with one exemplary embodiment of the present invention. Referring to FIG. 10, in control of optimization of operation of the fuel cell (Operation S600), required output may be adjusted to increase output of the high voltage battery, which supplies the required output distributively in conjunction with the fuel cell stack 10, based on the determined irreversible degradation state.

When the irreversible degradation state of the fuel cell stack 10 becomes severe, relatively more output of the high voltage battery may be used. Particularly, since, when the fuel cell stack 10 is irreversibly degraded, the maximum output may be reduced further than in a state before irreversible degradation of the fuel cell stack 10, the distribution ratio may be adjusted to decrease the required output of the fuel cell stack 10 and increase the required output of the high voltage battery under the condition that the required output of the driving source is the same. Therefore, excessive increase in output of the fuel cell stack 10 may be prevented, and thus, durability of the fuel cell stack 10 may be increased and efficiency and fuel efficiency of the fuel cell system may be improved.

In another exemplary embodiment, the maximum required output of the driving source may be restricted by reflecting decrease in the maximum output of the fuel cell stack 10. As is apparent from the above description, in a method and system for controlling operation of a fuel cell in accordance with the present invention, an irreversible degradation state of a fuel cell stack may be determined as distinguished from reversible degradation of the fuel cell stack. Further, the fuel cell may be operated based on the determined irreversible degradation state, and thereby, output performance and efficiency of the fuel cell may be increased and thus marketability of the fuel cell may be improved. In addition, excessive increase in output of the fuel cell stack may be prevented, and thus, durability of the fuel cell stack may be increased and efficiency and fuel efficiency of a fuel cell system may be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling operation of a fuel cell, comprising:
    determining, by a controller, whether a fuel cell stop mode configured to stop output of a fuel cell stack is released and the output of the fuel cell stack is resumed;
    estimating, by the controller, an effective catalyst amount within the fuel cell stack, wherein the effective catalyst amount is estimated in response to determining that the output of the fuel cell stack is resumed;
    monitoring, by the controller, a change in the estimated effective catalyst amount according to time; and
    determining, by the controller, an irreversible degradation state of the fuel cell stack based on the monitored change in the estimated effective catalyst amount,
    wherein, in monitoring the change in the estimated effective catalyst amount according to time, a gradual decrease in the estimated effective catalyst amount from a maximum value is monitored as time elapses when the output of the fuel cell stack is resumed.

2. The method according to claim 1, wherein, in estimating the effective catalyst amount, the effective catalyst amount is estimated using state data including a water content of an electrode membrane, pressure of a cathode, pressure of an anode, temperature of cooling water, stack current and stack voltage.

3. The method according to claim 1, wherein:
    in monitoring the change in the estimated effective catalyst amount according to time, a decrease rate of the estimated effective catalyst amount, gradually decreased from the maximum value of the effective catalyst amount according to time, is calculated according to time; and
    in determining the irreversible degradation state, the irreversible degradation state of the fuel cell stack is determined based on the calculated decrease rate of the estimated effective catalyst amount according to time.

4. The method according to claim 3, wherein, in determining the irreversible degradation state, as the calculated decrease rate of the estimated effective catalyst amount according to time is increased, the irreversible degradation state of the fuel cell stack increases.

5. The method according to claim 1, wherein:
    in monitoring the change in the estimated effective catalyst amount according to time, a delay time from a point in time when the output of the fuel cell stack is resumed to a point in time when the effective catalyst amount starts to be decreased from the maximum value is measured; and
    in determining the irreversible degradation state of the fuel cell stack, the irreversible degradation state of the fuel cell stack is determined based on the measured delay time.

6. The method according to claim 5, wherein, in determining the irreversible degradation state of the fuel cell stack, as the measured delay time is decreased, the irreversible degradation state increases.

7. The method according to claim 1, further comprising:
controlling, by the controller, optimization of the operation of the fuel cell based on the determined irreversible degradation state, after determining the irreversible degradation state.

8. The method according to claim 7, further comprising:
increasing, by the controller, cooling performance of a cooling system of the fuel cell stack based on the determined irreversible degradation state.

9. The method according to claim 7, further comprising:
increasing, by the controller, pressure of a hydrogen supply system configured to supply hydrogen to the fuel cell stack based on the determined irreversible degradation state.

10. The method according to claim 7, further comprising:
increasing, by the controller, pressure of an air supply system configured to supply air to the fuel cell stack based on the determined irreversible degradation state.

11. The method according to claim 7, further comprising:
increasing, by the controller, output of a high voltage battery configured to supply required output in conjunction with the fuel cell stack based on the determined irreversible degradation state.

* * * * *